(12) United States Patent
Burge

(10) Patent No.: US 10,823,030 B2
(45) Date of Patent: Nov. 3, 2020

(54) METHOD AND APPARATUS TO CONTROL VALVE OPERATION FOR CLOSE COUPLED SCR

(71) Applicant: Faurecia Emissions Control Technologies, USA, LLC, Columbus, IN (US)

(72) Inventor: Neil Burge, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 81 days.

(21) Appl. No.: 16/004,603

(22) Filed: Jun. 11, 2018

(65) Prior Publication Data
US 2019/0376429 A1 Dec. 12, 2019

(51) Int. Cl.
*F01N 3/00* (2006.01)
*F01N 3/20* (2006.01)
*F01N 9/00* (2006.01)

(52) U.S. Cl.
CPC ......... *F01N 3/2053* (2013.01); *F01N 3/2066* (2013.01); *F01N 9/00* (2013.01); *F01N 2560/026* (2013.01); *F01N 2560/06* (2013.01); *F01N 2560/07* (2013.01); *F01N 2610/02* (2013.01); *F01N 2900/1402* (2013.01); *F01N 2900/1404* (2013.01); *F01N 2900/1411* (2013.01)

(58) Field of Classification Search
CPC .................................. F01N 3/2066; F01N 9/00
USPC .......................................................... 60/274
See application file for complete search history.

(56) References Cited

U.S. PATENT DOCUMENTS

| 6,173,568 B1* | 1/2001 | Zurbig | B01D 53/9431 |
| | | | 123/406.53 |
| 6,192,675 B1* | 2/2001 | Hirota | B01D 53/9431 |
| | | | 422/170 |
| 6,220,022 B1* | 4/2001 | Muller | B01D 53/9454 |
| | | | 422/170 |

(Continued)

FOREIGN PATENT DOCUMENTS

| CN | 106894867 A | 6/2017 |
| EP | 2466084 A1 | 6/2012 |

(Continued)

*Primary Examiner* — Jason D Shanske
(74) *Attorney, Agent, or Firm* — Carlson, Gaskey & Olds, P.C.

(57) ABSTRACT

A vehicle exhaust system includes a first exhaust aftertreatment module that receives engine exhaust gases and a second exhaust after-treatment module that is downstream of the first exhaust after-treatment module. A valve is moveable between an open position that blocks flow to the first exhaust after-treatment module such that all exhaust gas flow bypasses the first exhaust after-treatment module and is directed into the second exhaust after-treatment module, a closed position that directs flow into the first exhaust aftertreatment module before the flow enters the second exhaust after-treatment module, and a partially open position where one portion of flow is directed into the first exhaust aftertreatment module and a remaining portion of flow is directed into the second exhaust after-treatment module. A controller controls movement of the valve between the open, closed, and partially open positions based on at least one of engine flow rate and NOx output.

18 Claims, 1 Drawing Sheet

(56) References Cited

U.S. PATENT DOCUMENTS

| | | | |
|---|---|---|---|
| 6,502,391 B1* | 1/2003 | Hirota | F01N 3/0814 60/288 |
| 6,871,490 B2 | 3/2005 | Liang et al. | |
| 7,799,289 B2* | 9/2010 | Robel | F01N 3/0231 422/180 |
| 8,544,260 B2* | 10/2013 | Boorse | F01N 3/035 60/273 |
| 2002/0059915 A1* | 5/2002 | Houston | F02D 41/1473 123/305 |
| 2003/0110761 A1* | 6/2003 | Minami | F01N 3/2053 60/280 |
| 2004/0005250 A1* | 1/2004 | Fischer | B01J 35/04 422/180 |
| 2005/0069476 A1* | 3/2005 | Blakeman | B01D 53/9495 423/239.1 |
| 2007/0271908 A1 | 11/2007 | Hemingway et al. | |
| 2008/0127638 A1 | 6/2008 | Vaarkamp et al. | |
| 2008/0155968 A1 | 7/2008 | Salemme et al. | |
| 2009/0266063 A1* | 10/2009 | Gandhi | B01D 53/9418 60/301 |
| 2010/0199634 A1 | 8/2010 | Heaton | |
| 2011/0058999 A1* | 3/2011 | Ettireddy | B01J 37/0244 423/213.5 |
| 2011/0061374 A1* | 3/2011 | Noritake | F01N 3/2066 60/286 |
| 2012/0204542 A1* | 8/2012 | Norris | F01N 9/00 60/274 |
| 2012/0216529 A1 | 8/2012 | Joshi et al. | |
| 2014/0109553 A1* | 4/2014 | Roberts, Jr. | F01N 9/00 60/274 |
| 2014/0230433 A1* | 8/2014 | Yacoub | F02B 37/162 60/605.1 |
| 2014/0311123 A1* | 10/2014 | Gonze | F01N 11/002 60/274 |
| 2014/0352279 A1* | 12/2014 | Gonze | F01N 3/208 60/274 |
| 2014/0363358 A1 | 12/2014 | Udd et al. | |
| 2015/0252706 A1 | 9/2015 | Kosters et al. | |
| 2015/0337702 A1* | 11/2015 | Ettireddy | F01N 3/106 60/297 |
| 2016/0032803 A1* | 2/2016 | Ettireddy | B01J 29/7815 60/289 |
| 2016/0166990 A1 | 6/2016 | Phillips et al. | |
| 2016/0215673 A1* | 7/2016 | Noren, IV | B01F 5/0057 |
| 2017/0067382 A1 | 3/2017 | Hillen | |

FOREIGN PATENT DOCUMENTS

| | | |
|---|---|---|
| JP | 2013124610 A * | 6/2013 |
| KR | 20170049889 A | 5/2017 |
| WO | 2012123660 A1 | 9/2012 |

\* cited by examiner

METHOD AND APPARATUS TO CONTROL VALVE OPERATION FOR CLOSE COUPLED SCR

BACKGROUND OF THE INVENTION

An exhaust system conducts hot exhaust gases generated by an engine through various exhaust components to reduce emissions such as nitrogen oxides NOx, for example. The exhaust system includes an injection system that injects fluid, for example ammonia, a diesel exhaust fluid (DEF), or a reducing agent such as a solution of urea and water, upstream of a selective catalytic reduction (SCR) catalyst. A mixer is positioned upstream of the SCR catalyst and mixes engine exhaust gases and products of the injected fluid. This mixture is then introduced into the SCR catalyst. The SCR converts the NOx, in the presence of the mixture of exhaust gas and injected fluid, into nitrogen and water. Under low temperature operating conditions, e.g. cold start and/or low flow conditions, this conversion becomes more difficult.

SUMMARY OF THE INVENTION

In one exemplary embodiment, a vehicle exhaust system includes a first exhaust after-treatment module that receives engine exhaust gases and a second exhaust after-treatment module that is downstream of the first exhaust after-treatment module. A valve is moveable between an open position that blocks flow to the first exhaust after-treatment module such that all exhaust gas flow bypasses the first exhaust after-treatment module and is directed into the second exhaust after-treatment module, a closed position that directs flow into the first exhaust after-treatment module before the flow enters the second exhaust after-treatment module, and a partially open position where one portion of flow is directed into the first exhaust after-treatment module and a remaining portion of flow is directed into the second exhaust after-treatment module. A controller controls movement of the valve between the open, closed, and partially open positions based on at least one of engine flow rate and NOx output.

In a further embodiment of the above, the controller controls movement of the valve based on exhaust gas temperature, engine flow rate, NOx output, or any combination thereof.

In a further embodiment of any of the above, the first exhaust after-treatment module includes at least a first ammonia source, a first mixing element, and a first SCR, and wherein the second exhaust after-treatment module includes at least a second ammonia source, a second mixing element, and a second SCR.

In a further embodiment of any of the above, the first exhaust after-treatment module is immediately downstream of the engine.

In a further embodiment of any of the above, the first SCR is smaller than the second SCR.

In a further embodiment of any of the above, the valve is only in the closed position during cold start or low flow conditions and wherein valve position is actively adjusted by the controller to vary the partially open position during high temperature and/or high flow conditions.

In another exemplary embodiment, a method of controlling a valve in a vehicle exhaust system includes controlling movement of the valve between the open, closed, and partially open positions based on at least one of engine flow rate and NOx output.

These and other features of this application will be best understood from the following specification and drawings, the following of which is a brief description.

DETAILED DESCRIPTION

Figure 1:
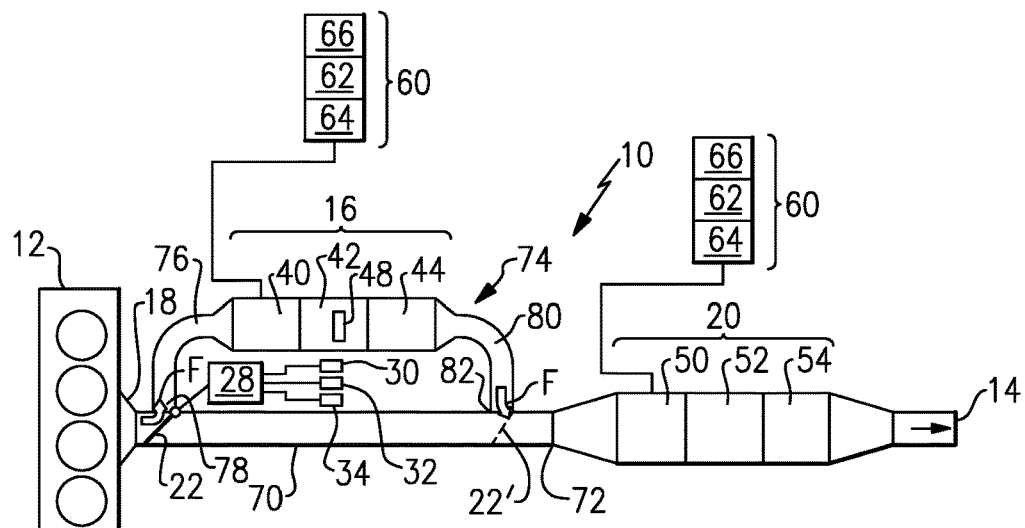
FIG. 1 schematically illustrates one example of an exhaust system with a valve and controller according to the subject invention, wherein the valve is in the closed position.

FIG. 1 shows a vehicle exhaust system 10 that conducts hot exhaust gases generated by an engine 12 through various components to an exhaust outlet 14 to atmosphere. The exhaust system 10 includes a first exhaust after-treatment module 16 that receives engine exhaust gases from an engine exhaust manifold 18 and a second exhaust after-treatment module 20 that is downstream of the first exhaust after-treatment module 16. A valve 22 is mounted within the exhaust system 10 to direct exhaust through the first exhaust after-treatment module 16 and/or the second exhaust after-treatment module 20.

Figure 2:
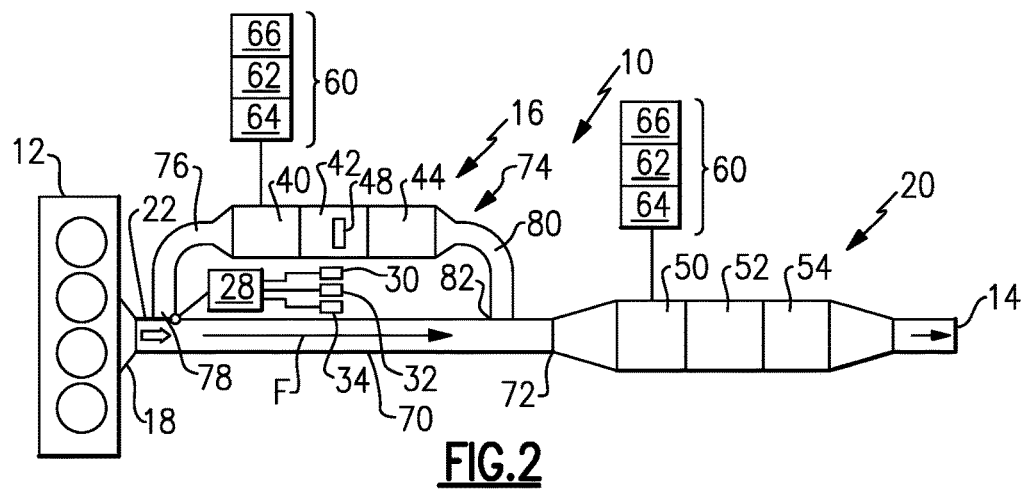
FIG. 2 is similar to FIG. 1 but shows the valve in an open position.

In one example, the valve 22 is moveable between at least an open position, closed position, and a partially open and variable position. In the closed position the valve 22 directs flow F into the first exhaust after-treatment module 16 before the flow enters the second exhaust after-treatment module 20 as shown in FIG. 1. In the open position the valve 22 blocks flow to the first exhaust after-treatment module 16 such that all exhaust gas flow F bypasses the first exhaust after-treatment module 16 and is directed into the second exhaust after-treatment module 20 as shown in FIG. 2. When in the partially open and variable position, the valve 22 is positioned such that one portion of flow 24 is directed into the first exhaust after-treatment module 16 and a remaining portion of flow 26 is directed into the second exhaust after-treatment module 20.

Any type of valve can be used to control the flow of the exhaust gas between the modules 16, 20. In one example, the valve 22 comprises a valve flap or disc body that is pivotally supported by and positioned to extend across a cross-sectional area of a pipe within which the valve 22 is mounted. The valve 22 can be biased via a spring or other similar element to the closed position. An actuator/controller 28 can be coupled to the valve to control movement thereof.

In one example, the controller 28 controls movement of the valve 22 between the open, closed, and partially open/variable positions based on at least one of engine flow rate and NOx output. At least one flow sensor 30 communicates engine flow information to the controller 28. At least one NOx sensor 32 communicates NOx output information to the controller 28. One or more temperatures sensors 34 communicate exhaust gas temperature information to the controller 28. The sensors 30, 32, 34 can be placed in any of various positions within the exhaust system 10 as needed dependent upon vehicle application, packaging space, etc. In one example, the controller 28 controls movement of the valve 22 based on engine flow rate and in another example, the controller 28 controls movement of the valve 22 based on NOx output. However, the controller 28 can control movement of the valve 22 based on exhaust gas temperature, engine flow rate, NOx output, or any combination thereof.

In one example, the first exhaust after-treatment module 16 includes at least a first ammonia source 40, a first mixing element 42, and a first selective catalytic reduction (SCR) catalyst 44, and the second exhaust after-treatment module 20 includes at least a second ammonia source 50, a second mixing element 52, and a second SCR 54. Other components, such as a particulate filter and/or a diesel oxidation catalyst (DOC) could also optionally be included in one or both of the modules 16, 20. In one example, the first exhaust after-treatment module 16 is immediately downstream of the engine 12.

In one example, the first 40 and second 50 ammonia sources are connected to an injection system 60 that is used to inject fluid such as ammonia, a diesel exhaust fluid (DEF), or a reducing agent such as a solution of urea and water, for example into the exhaust gas stream upstream from the first 44 and second 54 SCRs such that the respective first 42 and second 52 mixing elements can mix the injected fluid and exhaust gas thoroughly together. The injection system 60 includes a fluid supply 62, a doser 64, and a controller 66 that controls injection of the fluid as known. The controller 66 can be a separate controller from the controller 28 that controls the valve 22, or a common controller can be used. In this example, two separate injection systems 60 are shown for each of the first 16 and second 20 exhaust after-treatment modules; however, a single injection system 60 could be used for both exhaust after-treatment modules 16, 20. The advantage of using a separate injection system for each of the first 40 and second 50 ammonia sources is that two different types of fluid can be used if needed. The advantages of using a single system include a reduced number of components, reduced cost, and less packaging space is required.

In one example, the mixing elements 42, 52 comprise a mixer body with an internal mixing structure 48 such as one or more plates and/or baffles, which thoroughly mixes injected fluid with the exhaust gases and subsequently directs the mixture of engine exhaust gas and the injected fluid to the SCRs 44, 54. Any type of mixing element 42, 52 can be used in the modules 16, 20. Further, the ammonia source can be combined with the mixing element in a compact mixer configuration for vehicles with tight packaging constraints.

As discussed above, the first exhaust after-treatment module 16 is immediately downstream of the engine 12 in a close-coupled arrangement as shown in FIG. 1. This mounting location is particularly useful for improving operation of the modules for cold start or low flow conditions. In one example, the first SCR 44 is smaller than the second SCR 54 because it is only fully utilized at low flow or cold start conditions and the valve 22 allows the flow to bypass the close coupled SCR module 16 at higher flow rates when needed. In one example, at least one bypass exhaust pipe 70 connects the exhaust manifold 18 to an inlet 72 to the second exhaust after-treatment module 20. A main exhaust pipe 74 is parallel to the bypass pipe 70 and includes the first exhaust after-treatment module 16. The main exhaust pipe 74 includes a first pipe 76 providing an inlet 78 to the main exhaust pipe 74 at an upstream location in the bypass pipe 70 and a second pipe 80 that provides an outlet 82 from the main exhaust pipe 74 at a downstream location in the bypass pipe 70. The flow exiting the outlet 82 is then directed into the inlet 72 to the second exhaust after-treatment module 20.

The subject invention provides a valve 22, which is able to be opened at various angles throughout the engine operational range. FIG. 1 shows the valve 22 in the closed position, i.e. blocking flow through the main exhaust pipe 70, with the exhaust gas flow being forced into the more restrictive close-coupled exhaust after-treatment module 16. The first ammonia source 40 is also activated by the controller 28 and/or 66 to inject the fluid as described above. Because this first exhaust after-treatment module 16 is closer to the engine 12 and has a smaller volume SCR 44, it heats up more quickly and becomes more effective at controlling NOx. The ammonia source 50 of the second or main after-treatment module 20 is not activated at this point, and the second or main SCR substrates of the second SCR 54 are not at operational temperatures.

FIG. 2 shows the valve 22 in the open position for normal high flow operations after start-up. In this position, the valve 22 is located at the inlet 78 to the main exhaust pipe 74 and blocks flow from entering the main exhaust pipe 74 such that all the exhaust gas passes through the main after-treatment module 20. The fluid injection is also inactivated in the close-coupled SCR 42. This configuration offers lower back-pressure under higher flow/higher temperature operations. These higher flow higher temperature operations provide enough heat energy for the larger diameter substrates in the main after-treatment module 20 to heat up and become an effective form of NOx control.

Figure 3:
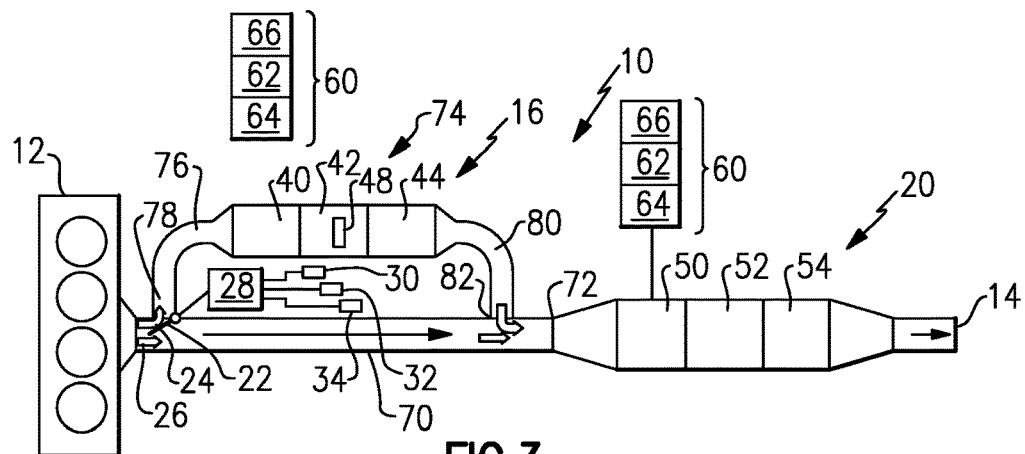
FIG. 3 is similar to FIG. 1 but shows the valve in a partially open position.

FIG. 3 shows the valve 22 in a partially open position with partial flow through both modules 16, 20. This position can be varied by the controller 28 to adjust the amount of flow to each module 16, 20 as needed. As such, the valve 22 can be used at variable angles to make the most effective and efficient use of the close-coupled after-treatment module 16 by capitalizing on the higher upstream temperatures and reducing the average NOx level in the exhaust gas at the main after-treatment module 20. The valve 22 can be controlled to revert to the close-coupled path at times in the duty cycle when the gas flow rate and temperature are low and there is a benefit (in terms of NOx conversion ability) in using the smaller hotter close coupled SCR.

Thus, the subject invention provides a configuration where the variable control of the valve 22 gives continuous use of the close-coupled after-treatment module 16 while maintaining low pack pressure. The controller 28 controls the valve 22 via a program using an algorithm that is based on engine flow rate, or flow rate and temperature, or NOx output, or any combination of these characteristics. The controller 28 can include a processor, memory, and one or more input and/or output (I/O) device interface(s) that are communicatively coupled via a local interface. The local interface can include, for example but not limited to, one or more buses and/or other wired or wireless connections. Further, the local interface may include address, control, and/or data connections to enable appropriate communications among the aforementioned components.

The controller 28 may be a hardware device for executing software, particularly software stored in memory. The controller 28 can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements and/or nonvolatile memory elements as known.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. The controller 28 can be configured to execute software stored within the memory, to communicate data to and from the memory, and to generally control operations of the computing device pursuant to the software. Software in memory, in whole or in part, is read by the processor, perhaps buffered within the processor, and then executed.

In one example, the peak gas flow from the engine 12 may be 1600 Kg/hr, with 9 g/KWhr NOx. The close-coupled after-treatment module 16 may only be able to accommodate 600 Kg/hr (limited by backpressure and SCR volume) so as the flow rate increased from 500 Kg/hr upward, the controller 28 would open the valve 22 proportional to the extra flow to maintain ~550 Kg/hr through the close-coupled after-treatment module 16. With around 30% of the exhaust NOx treated by the close-coupled after-treatment module 16, when the treated and untreated gases merge and mix, the main after-treatment module 20 only has to treat the equivalent of 6 g/KW hr NOx, so the SCR substrates can be smaller, the ammonia introduced at the main after-treatment module 20 can be reduced, and the deposit risk (if using DEF) can be substantially reduced.

In the example shown in FIGS. 1-3, the valve 22 is located at the inlet 78 to the main exhaust pipe 74. It should be understood that the valve 22 could also be located downstream of the inlet 78 or at the outlet 82 from the main exhaust pipe 74 (see valve 22' in FIG. 1).

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component assembly comprising:
   a first exhaust after-treatment module that receives exhaust gases generated by an engine;
   a second exhaust after-treatment module downstream of the first exhaust after-treatment module; and
   a valve moveable between
      an open position that blocks flow to the first exhaust after-treatment module such that all exhaust gas flow bypasses the first exhaust after-treatment module and is directed into the second exhaust after-treatment module,
      a closed position that directs flow into the first exhaust after-treatment module before the flow enters the second exhaust after-treatment module, and
      a partially open position where one portion of flow is directed into the first exhaust after-treatment module and a remaining portion of flow is directed into the second exhaust after-treatment module;
   a controller that controls movement of the valve between the open, closed, and partially open positions;
   at least one flow sensor that communicates engine flow rate information to the controller;
   at least one NOx sensor that communicates NOx output information to the controller; and
   wherein movement of the valve is controlled via the controller based on the engine flow rate information and based on the NOx output information.

2. The vehicle exhaust component assembly according to claim 1, including one or more temperature sensors that communicate exhaust gas temperature information to the controller, and wherein the controller controls movement of the valve further based on exhaust gas temperature.

3. The vehicle exhaust component assembly according to claim 1, wherein the first exhaust after-treatment module includes at least a first ammonia source, a first mixer, and a first SCR, and wherein the second exhaust after-treatment module includes at least a second ammonia source, a second mixer, and a second SCR.

4. The vehicle exhaust component assembly according to claim 3, wherein the first exhaust after-treatment module is immediately downstream of the engine such that an exhaust manifold outlet is directly connected to an inlet to the first exhaust after-treatment module.

5. The vehicle exhaust component assembly according to claim 4, including at least one bypass pipe that connects the exhaust manifold outlet from the engine directly to an inlet to the second exhaust after-treatment module, and including at least one main exhaust pipe in parallel to the bypass pipe and that includes the first exhaust after-treatment module, and wherein an inlet to the main exhaust pipe is in communication with the bypass pipe and an outlet of the main exhaust pipe is in communication with the bypass pipe downstream of the inlet to the main exhaust pipe.

6. The vehicle exhaust component assembly according to claim 5, wherein the valve is positioned at the inlet of the main exhaust pipe.

7. The vehicle exhaust component assembly according to claim 5, wherein the valve is positioned at the outlet of the main exhaust pipe.

8. The vehicle exhaust component assembly according to claim 3, wherein the first SCR is smaller than the second SCR.

9. The vehicle exhaust component assembly according to claim 3, wherein the valve is only in the closed position during a cold start condition where an exhaust gas temperature is below a predetermined temperature or a low flow condition where an exhaust flow rate is below a predetermined exhaust flow rate, and wherein valve position is actively adjusted by the controller to vary the partially open position during a high temperature condition where an exhaust gas temperature is above a predetermined temperature or during a high flow condition where an exhaust flow rate is above a predetermined exhaust flow rate-.

10. The vehicle exhaust component assembly according to claim 1, wherein an exhaust manifold outlet is directly connected to an inlet to the first exhaust after-treatment module, and including at least one bypass pipe that directly connects the exhaust manifold outlet from the engine directly to an inlet to the second exhaust after-treatment module.

11. A method of controlling a valve in a vehicle exhaust system comprising:
   providing a first exhaust after-treatment module that receives exhaust gases generated by an engine, a second exhaust after-treatment module downstream of the first exhaust after-treatment module, and the valve moveable between
      an open position that blocks flow to the first exhaust after-treatment module such that all exhaust gas flow bypasses the first exhaust after-treatment module and is directed into the second exhaust after-treatment module,
      a closed position that directs flow into the first exhaust after-treatment module before the flow enters the second exhaust after-treatment module, and
      a partially open position where one portion of flow is directed into the first exhaust after-treatment module and a remaining portion of flow is directed into the second exhaust after-treatment module;

providing at least one flow sensor to communicate engine flow rate information to a controller;
providing at least one NOx sensor that communicates NOx output information to the controller; and
controlling movement of the valve between the open, closed, and partially open positions based on the engine flow rate information and based on the NOx output information.

12. The method according to claim 11, including providing one or more temperature sensors that communicate exhaust gas temperature information to the controller, and including controlling movement of the valve further based on exhaust gas temperature.

13. The method according to claim 11, wherein the first exhaust after-treatment module includes at least a first ammonia source, a first mixer, and a first SCR, and wherein the second exhaust after-treatment module includes at least a second ammonia source, a second mixer, and a second SCR.

14. The method according to claim 13, wherein the first exhaust after-treatment module is immediately downstream of the engine such that an exhaust manifold is directly connected to an inlet to the second exhaust after-treatment module, and wherein the first SCR is smaller than the second SCR.

15. The method according to claim 11, including directly connecting an exhaust manifold outlet to an inlet to the first exhaust after-treatment module, and providing at least one bypass pipe that connects the exhaust manifold outlet from the engine directly to an inlet to the second exhaust after-treatment module.

16. A method comprising:
providing a first exhaust after-treatment module that receives exhaust gases generated by an engine, a second exhaust after-treatment module downstream of the first exhaust after-treatment module, and a valve moveable between
an open position that blocks flow to the first exhaust after-treatment module such that all exhaust gas flow bypasses the first exhaust after-treatment module and is directed into the second exhaust after-treatment module,
a closed position that directs flow into the first exhaust after-treatment module before the flow enters the second exhaust after-treatment module, and
a partially open position where one portion of flow is directed into the first exhaust after-treatment module and a remaining portion of flow is directed into the second exhaust after-treatment module;
providing at least one flow sensor to communicate engine flow rate information to a controller;
providing at least one NOx sensor that communicates NOx output information to the controller;
providing at least one temperature sensor to communicate exhaust gas temperature information to the controller;
selectively moving the valve between the open, closed, and partially open positions in response to a predetermined operating condition, and wherein the predetermined operating condition includes at least engine flow rate, exhaust gas temperature, and NOx output; and
controlling movement of the valve between the open, closed, and partially open positions based on the engine flow rate information, based on the exhaust gas temperature information, and based on the NOx output information.

17. The method according to claim 16, wherein the valve is only in the closed position when the exhaust gas temperature is below a predetermined temperature and when the exhaust flow is below a predetermined exhaust flow rate.

18. The method according to claim 16, including directly connecting an exhaust manifold outlet to an inlet to the first exhaust after-treatment module, and providing at least one bypass pipe that connects the exhaust manifold outlet from the engine directly to an inlet to the second exhaust after-treatment module.

* * * * *